(12) United States Patent
Haas et al.

(10) Patent No.: US 8,801,829 B2
(45) Date of Patent: Aug. 12, 2014

(54) METHOD FOR PRODUCTION OF NIOBIUM AND TANTALUM POWDER

(75) Inventors: Helmut Haas, Schladen-Beuchte (DE); Ulrich Bartmann, Goslar (DE); Tadashi Komeya, Ibaraki (JP); Nobuyuki Sato, Ibaraki (JP)

(73) Assignee: H. C. Starck GmbH & Co. KG (DE)

( * ) Notice: Subject to any disclaimer, the term of this patent is extended or adjusted under 35 U.S.C. 154(b) by 0 days.

(21) Appl. No.: 12/910,220

(22) Filed: Oct. 22, 2010

(65) Prior Publication Data

US 2011/0067527 A1 Mar. 24, 2011

Related U.S. Application Data

(62) Division of application No. 11/568,207, filed as application No. PCT/EP2005/003758 on Apr. 9, 2005, now Pat. No. 7,824,463.

(30) Foreign Application Priority Data

Apr. 23, 2004 (DE) .......................... 10 2004 020 052

(51) Int. Cl.
 *B22F 9/22* (2006.01)
(52) U.S. Cl.
 CPC ............... *B22F 9/22* (2013.01); *B22F 2301/20* (2013.01); *B22F 2203/13* (2013.01)
 USPC ................................. 75/367; 75/369; 75/622

(58) Field of Classification Search
 None
 See application file for complete search history.

(56) References Cited

U.S. PATENT DOCUMENTS

| | | | |
|---|---|---|---|
| 6,171,363 B1 | 1/2001 | Shekhter et al. | |
| 6,193,779 B1 | 2/2001 | Reichert et al. | |
| 6,558,447 B1* | 5/2003 | Shekhter et al. | 75/252 |
| 7,150,776 B2 | 12/2006 | Shekhter et al. | |
| 2002/0041819 A1* | 4/2002 | Kumar et al. | 419/66 |
| 2003/0110890 A1 | 6/2003 | He et al. | |

FOREIGN PATENT DOCUMENTS

| | | |
|---|---|---|
| CN | 1410209 A | 4/2003 |
| EP | 1 302 263 | 4/2003 |
| JP | 2003-013115 | 1/2003 |
| TW | 570852 B | 1/2004 |
| WO | WO-00/67936 | 11/2000 |

* cited by examiner

*Primary Examiner* — George Wyszomierski
(74) *Attorney, Agent, or Firm* — Drinker Biddle & Reath LLP

(57) ABSTRACT

Process for the production of valve metal powders, in particular niobium and tantalum powder, by reduction of corresponding valve metal oxide powders by means of vaporous reducing metals and/or hydrides thereof, preferably in the presence of an inert carrier gas, wherein the reduction is performed at a vapor partial pressure of the reducing metal/metal hydride of 5 to 110 hPa and an overall pressure of less than 1000 hPa, and tantalum powder obtainable in this way having a high stability of the powder agglomerate particles.

20 Claims, 4 Drawing Sheets

METHOD FOR PRODUCTION OF NIOBIUM AND TANTALUM POWDER

RELATED APPLICATIONS

This Application is a Division of U.S. patent application Ser. No. 11/568,207, filed on Apr. 5, 2007, now U.S. Pat. No. 7,824,463, which is a U.S. national stage application of International Application No. PCT/EP2005/003758, filed Apr. 9, 2005, all of which are incorporated herein by reference in their entirety and which claims priority of German Patent Application No. 10 2004 020 052.1, filed on Apr. 23, 2004.

The present invention concerns a process for the production of valve metal powders having a large specific surface area from the corresponding oxides using gaseous reducing metals and/or metal hydrides and also a process for the production of tantalum powder, which is suitable as an anode material for electrolyte capacitors having a high specific capacity.

The process is based on the reduction of valve metal oxide powders by means of vaporous reducing metals such as alkali metals, aluminium, magnesium, calcium, barium and/or lanthanum and/or hydrides thereof, in particular magnesium.

Oxides of titanium, zirconium, hafnium, vanadium, niobium, tantalum, molybdenum and/or tungsten, preferably of niobium and/or tantalum, are used according to the invention as valve metal oxides.

Such a process is known from WO 00/67936 A1. According to the examples disclosed therein, fine-particle, partially sintered tantalum pentoxide, which forms a porous bed on a tantalum wire mesh, is reduced to the metal at 900 to 1000° C. under argon protective gas by means of magnesium vapour, which is generated underneath the mesh by heating magnesium chips. In this temperature range the magnesium vapour partial pressure is around 150 to 400 hPa (=mbar). The reduction time is between 2 and 12 hours. Metal powders having specific surface areas of 2 to 7 $m^2/g$ are obtained, in one case (example 4) a specific surface area of 13.3 $m^2/g$ is cited, although the reduction time and the oxygen content of the reduction product are not stated for this example. On the basis of the comparatively high reduction temperature, it can be assumed that this is an incompletely reduced powder with a high defect structure, in which the reduction was interrupted after the initial disintegration of the starting oxide due to the large volume shrinkage and prior to the crystal densification and primary structure coarsening (decrease in specific surface area) that follow at the reduction temperature.

According to EP 1 302 263 A2, an incomplete reduction to $TaO_{0.6-0.35}$ with gaseous magnesium should be performed in a first reduction step, followed in a second step by the reduction to the metal with liquid magnesium. No details are given of the specific surface area after the first reduction step. A back-calculation of the examples, assuming that the residual oxygen in the surface oxygen preventing burning away on ingress of air is 3000 $\mu g/m^2$, gives specific surface areas of 6 $m^2/g$ for $TaO_{0.2}$ and 4.5 $m^2/g$ for $TaO_{0.15}$. On the basis of the characterisation as "incompletely reduced", substantial parts of the residual oxygen should be volumetric oxygen, so the actual specific surface area is smaller.

The object of the present invention was to provide a process that permits the production of valve metal powders having a large specific surface area, wherein agglomerate particles of the valve metal powders should where possible display a high stability.

It has been found that in the first reduction step, valve metal powders having a very dense primary structure and large specific surface area are obtained, whose oxygen content does not exceed the necessary surface passivation oxygen preventing burning away of 3000 $\mu g/m^2$, if the reduction of the valve metal oxide, in particular tantalum pentoxide, is performed under low vapour pressure of the reducing metal or metal hydride and low carrier gas pressure and hence also a low overall pressure in the reaction chamber.

The present invention accordingly provides a process for the production of valve metal powders by reduction of corresponding valve metal oxide powders by means of vaporous reducing metals such as alkali metals, aluminium, magnesium, calcium, barium and/or lanthanum and/or hydrides thereof, which is characterised in that the reduction is performed under a vapour partial pressure of the reducing metal/metal hydride of 5 to 110 hPa and the overall pressure in the reaction chamber during all or part of the reduction period is less than 1000 hPa.

The vapour pressure of the reducing metal is preferably less than 80 hPa, particularly preferably between 8 and 50 hPa.

Magnesium and/or magnesium hydride is preferably used as the reducing metal.

Reduction is preferably performed in the presence of an inert carrier gas, the partial pressure of the carrier gas preferably being 50 to 800 hPa, especially preferably less than 600 hPa, particularly preferably 100 to 500 hPa.

Inert gases such as helium, neon, argon or mixtures thereof are suitable as the inert carrier gas. Small additions of hydrogen can be advantageous. The carrier gas is preferably preheated to the reactor temperature before or during introduction into the reactor, thereby preventing vapour condensation of the reducing metal.

The overall pressure in the reaction chamber is made up of the vapour pressure of the reducing metal/metal hydride and the partial pressure of the inert carrier gas and according to the invention it is preferably below 1000 hPa (1 bar) for at least some of the time during the reduction. For example, the overall pressure is below 1000 hPa for at least half of the reduction period, preferably for at least 60% of the reduction period.

The overall pressure is preferably between 55 and 910 hPa, particularly preferably between 105 and 610 hPa, for at least some of the time during the reduction.

The reactor temperature is held at or slightly above the temperature at which the vapour pressure of the reducing metal is established, but at least at a temperature at which the reduction still proceeds adequately quickly. If the preferred reducing agent magnesium is used, the reactor temperature is preferably 680 to 880° C., preferably below 850° C., particularly preferably 690 to 800° C. and more preferably below 760° C.

The invention is preferably used to produce niobium or tantalum powder, in particular to reduce tantalum pentoxide powder to tantalum powder or niobium pentoxide powder to niobium powder.

The present invention accordingly also provides a process for the production of tantalum powder by reducing tantalum pentoxide by means of vaporous reducing metals such as alkali metals, aluminium, magnesium, calcium, barium and/or lanthanum and/or hydrides thereof, in particular magnesium, preferably under an inert carrier gas, which is characterised in that the reduction is performed under a vapour partial pressure of the reducing metal/metal hydride of 5 to 110 hPa and the overall pressure in the reaction chamber during all or part of the reduction period is less than 1000 hPa.

The reduction and the generation of the vapour of the reducing metal are preferably performed in the same reactor so that the reactor temperature also determines the vapour pressure of the reducing metal.

A porous, spongy powder having a particle size distribution of D10: 3 to 25 µm, D50: 15 to 80 µm and D90: 50 to 280 µm determined in accordance with ASTM B 822 (Malvern MasterSizer Sµ) and a surface area (BET) of 0.05 to 0.5 m$^2$/g determined according to ASTM D 3663 is preferably used as the tantalum pentoxide powder.

On completion of the reduction the metal powder obtained is passivated by oxidising the powder particle surface through controlled, gradual introduction of oxygen into the reactor after cooling to a temperature below 100° C. and washing out the reducing metal oxide that is formed with acids and water.

In this process tantalum powders having specific surface areas of 6 to 15 m$^2$/g, preferably 8 to 14 m$^2$/g, are obtained, with substantial retention of the particle size distribution of the starting oxide with already excellent mechanical stability of the particles. The oxygen content of the tantalum powder after passivation is around 3000 µg/m$^2$.

The invention allows the reduction temperature to be reduced to 680 to 880° C. with no substantial increase in the reduction time. If tantalum or niobium oxide agglomerate powders having primary particle sizes (diameter in the case of spherical primary particles, smallest dimension in the case of non-spherical primary particles) of 0.1 to 5 µm are used, reduction times of between 6 and 12 hours, preferably up to 9 hours, are sufficient. Not least, the lower reaction temperature gives rise to a not inconsiderable energy saving and protects process equipment needed for the reduction.

The vapour partial pressure of the reducing metal is preferably increased gradually during the reduction to compensate for the declining reduction rate and exothermic character due to the falling oxygen content of the valve metal powder used. In the case of magnesium, for example, the vapour pressure-determining temperature can range from 700 to 750° C. at the start of the reduction and be increased to a temperature in the range from 750 to 850° C. by the end of the reduction. The temperature is preferably increased by a difference of 50 to 100° C.

The process can be performed with a steady gas pressure, i.e. in a closed reactor, which contains the amount of inert carrier gas needed for the gas partial pressure at the operating temperature. It is preferable, however, for the inert carrier gas to flow through the reactor and the porous bed of the oxide to be reduced. This can be achieved by continuously or intermittently drawing off inert carrier gas from a point in the reactor and continuously or intermittently supplying inert carrier gas to a point in the reactor via an appropriate pressure control valve, wherein the evaporation source for the reducing metal or metal hydride, which is in a separate location from the bed of the oxide to be reduced, is positioned upstream in relation to the direction of flow of the inert carrier gas through the oxide bed.

According to a preferred embodiment of the invention, the reduction is performed under a falling partial pressure of the inert carrier gas, the final pressure being 50 to 250 hPa, particularly preferably 50 to 150 hPa.

According to a processing alternative, the gas pressure can be raised above normal pressure at the start of the reaction, so that the initial rate of diffusion of the metal or hydride vapour is reduced in accordance with the still high oxygen content of the oxide. This prevents an initial heating up of the oxide powder due to exothermic properties. For example, the pressure of the inert carrier gas can be between 1000 and 2000 hPa, preferably up to 1500 hPa.

It can also be advantageous to perform the reduction under a pulsating partial pressure of the inert carrier gas, the partial pressure preferably oscillating around an average pressure of 50 to 500 hPa with an amplitude of 100 to 150 hPa. The oscillation frequency can advantageously be 20 to 300 s, particularly preferably 30 to 120 s. This causes magnesium-free inert carrier gas to be "pumped out" of the pores in the bed and magnesium-containing inert carrier gas to be "pumped in" to the pores.

The tantalum powders having a large specific surface area obtained according to the invention are suitable for the production of electrolyte capacitors having specific capacities in the range from 200,000 to 300,000 µFV/g, by methods known per se, by deoxidising primary structure coarsening, compacting to form anode structures, sintering of the anode structures to form anode bodies, moulding and application of the counterelectrode.

It has also been found that the tantalum powders obtained are ideally suitable for the production of capacitors having specific capacities in the range from 60,000 to 160,000 µFV/g if they are subjected to a primary structure coarsening by a factor of at least 2.5, preferably by a factor of at least 3, particularly preferably by a factor of 4 to 6, in other words the specific surface area is reduced by a factor of 2.5 to 3, preferably by a factor of 4 to 6. The primary structure coarsening is performed by mixing the tantalum powders with hyperstoichiometric amounts of magnesium relative to the oxygen content of the powders and heating them under inert gas.

According to the invention, after primary structure coarsening, tantalum powders having a specific surface area of 0.9 to 6 m$^2$/g, preferably 0.9 to 4 m$^2$/g, are obtained, which consist of agglomerates of primary structures having an average smallest dimension of 0.15 to 0.8 µm, the agglomerate particles displaying an excellent stability, which is attributed to stable sintered bridges between the primary particles.

The tantalum powders according to the invention having a coarsened primary structure preferably consist of agglomerates having a particle size distribution with a D10 value of 5 to 30 µm, a D50 value of 20 to 100 µm and a D90 value of 40 to 250 µm according to ASTM B 822 (Malvern MasterSizer Sµ), the particle size distribution substantially corresponding to the particle size distribution of the oxide-reduced tantalum powders.

It has been found in particular that the powder agglomerates display a high agglomerate stability towards ultrasonic treatment, measured as the quotient of the D50 value according to ASTM B 822 (Malvern MasterSizer) and the D50 value after ultrasonic treatment (D50$_{US}$ value).

The invention accordingly also provides tantalum powders having a stability towards ultrasonic treatment, which are characterised by a D50/D50$_{US}$ quotient of less than 2, preferably less than 1.5. In order to determine this value, sufficient tantalum powder is dispersed in 700 ml water with 30 mg of the wetting agent Daxad 11, whilst stirring, until light weakening is in the range of around 20%, to avoid multiple reflections of the laser beam during the determination method. The concentration of tantalum powder in the suspension is then around 0.02 to 0.05 vol. %. The D50 value is then determined in accordance with ASTM B 822. An ultrasonic power of 60 W is then introduced with the ultrasonic generator on the MasterSizer Sµ whilst stirring for a further 5 minutes. This causes weak sintered bridges between agglomerate particles to be broken due to particle impact. A longer period of ultrasonic exposure causes no further change in the particle distribution. The D50 value is then determined again in accordance with ASTM B 822 ("D50$_{US}$ value").

The invention also provides the process for the production of such tantalum powders having a high agglomerate stability, which is characterised in that in a first step tantalum pentoxide is reduced to tantalum metal by means of vaporous reducing metals under a vapour partial pressure of 5 to 110 hPa, the powder is passivated after cooling, freed from adherent oxide of the reducing metal, and then coarsened in terms of its primary structure by mixing with magnesium and heating to 680 to 850° C.

EXAMPLES 1 TO 16

A) Reduction of Tantalum Pentoxide

Figure 2:
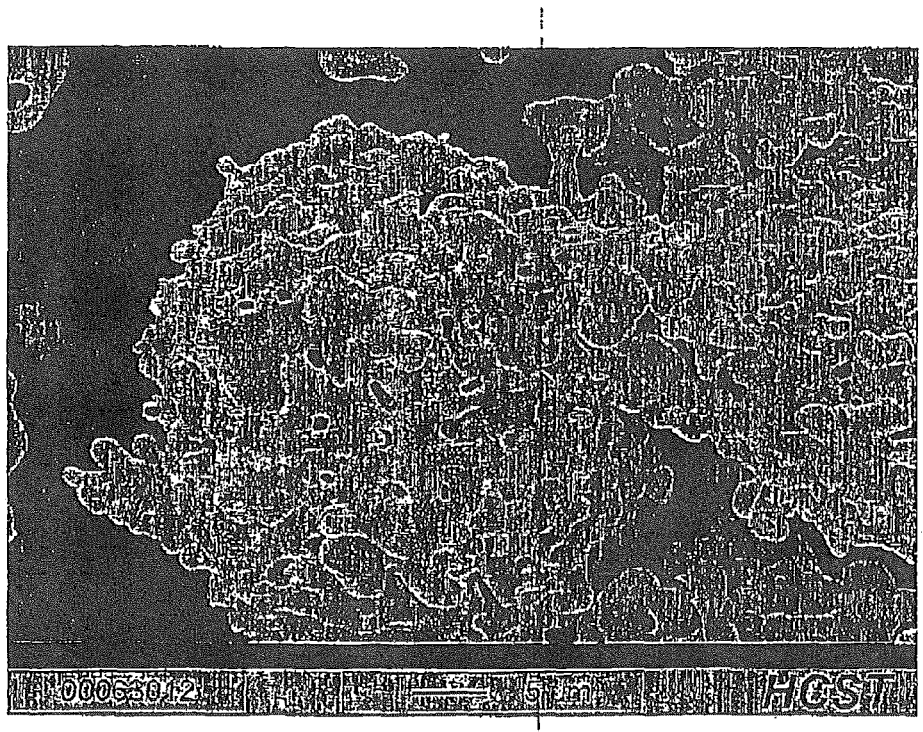
FIG. 2 shows an SEM image of a starting pentoxide used in the present invention.

A fine-particle, partially sintered starting tantalum pentoxide having an average primary particle size of around 0.01 µm (determined visually from SEM images (SEM=scanning electron microscope)), a particle size distribution determined in accordance with ASTM B 822 (Malvern MasterSizer Sp) corresponding to a D10 value of 17.8 µm, a D50 value of 34.9 µm and a D90 value of 71.3 µm and a specific surface area (BET) determined in accordance with ASTM D 3663 of 0.14 $m^2/g$ is used. The individual particles of the powder are highly porous. It can be seen from SEM images that the particles consist of highly sintered agglomerates of approximately spherical primary particles having an average diameter of 2.4 µm. FIG. 2 shows an SEM image of the starting pentoxide.

The starting tantalum pentoxide is placed on a mesh made from tantalum wire in a reactor clad in tantalum sheet above a crucible containing the 1.1 times stoichiometric amount (relative to the oxygen content of the pentoxide) of magnesium. The reactor is heated with an oven. In the reactor there is a gas inlet aperture below the magnesium-containing crucible and a gas withdrawal aperture above the tantalum pentoxide bed. The internal gas pressure in the oven can be measured by means of a tap line passing through the oven wall. Argon flowing slowly through the oven is used as the protective gas. Before the start of heating to the reduction temperature the reactor is rinsed with argon. Before the reduction temperature is reached, the argon pressure for the reduction is established. On completion of the reaction and after cooling the reactor, air is gradually introduced into the reactor to passivate the metal powder against burning away. The magnesium oxide that is formed is removed by washing with sulfuric acid and then demineralised water until it is neutralised.

Table 1 shows the reduction conditions and properties of the powders obtained after cooling and passivation in examples 1 to 16. The "MasterSizer D10, D50, D90" values are determined in accordance with ASTM B 822. The right-hand column also shows the oxygen content of the reduced tantalum relative to the specific surface area, i.e. the quotient of the oxygen content in ppm and the specific surface area measured in accordance with BET. A surface oxygen content of around 3000 ppm/$(m^2/g)$ is necessary, since otherwise the tantalum powder would be pyrophoric and would burn away on contact with the ambient air.

Examples 1 to 9 were performed substantially under a constant argon pressure and at a constant reactor temperature. The reactor temperature also defines the magnesium vapour partial pressure: 8 hPa at 700° C., 19 hPa at 750° C., 29 hPa at 780° C., 39 hPa at 800° C., 68 hPa at 840° C., 110 hPa at 880° C.

Figure 3:
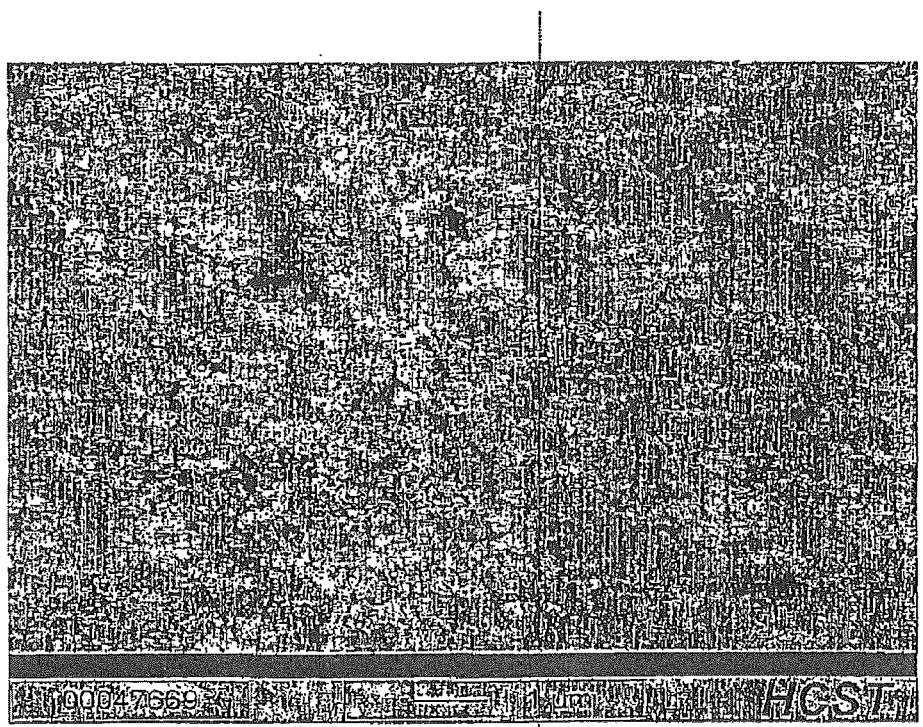
FIGS. 3 and 4 show SEM images of products according to the invention.
Figure 4:
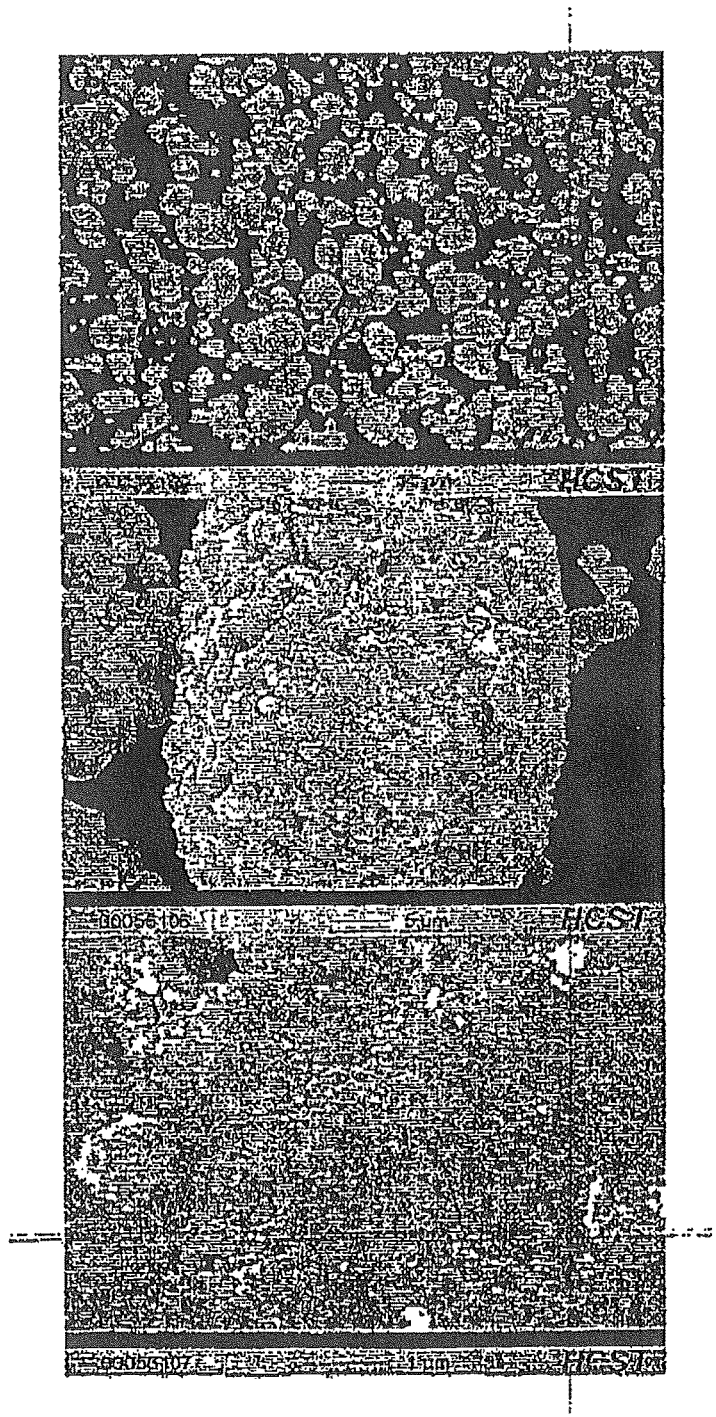

FIG. 3 shows an SEM image of the product according to example 9. FIG. 4 shows an SEM image of the product according to example 3.

Figure 1:
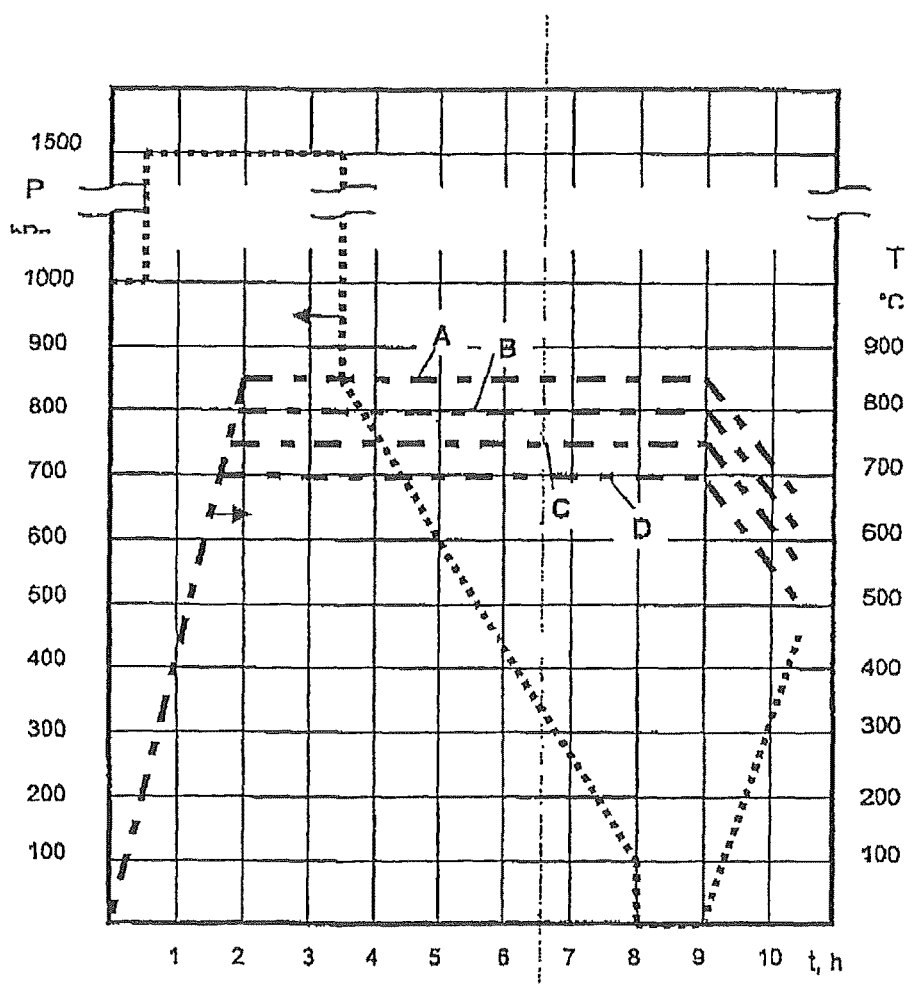
FIG. 1 shows changes in pressure and temperature with respect to time during several examples of a process of the invention.

In examples 10 to 13 reduction was performed substantially at a constant reactor temperature of 700, 750, 800 and 850° C. respectively, however reduction was performed initially for 1.5 hours under an elevated argon pressure of 1.5 atmospheres and then for 4.5 hours under an argon pressure falling from 850 hPa to 100 hPa. The change in pressure and temperature is shown in FIG. 1. The high pressure at the start of the reduction causes the reduction rate to slow down at the start of the exothermic reaction, resulting overall in an evening out of the reduction rate.

Examples 14 to 16 were performed at a temperature rising substantially uniformly over 7 hours from 700 to 780° C., 720 to 800° C. and 730 to 800° C. respectively.

The primary particle size was kept roughly constant in all samples, as was the particle size distribution, which can be seen from the MasterSizer D10, D50 and D90 values. The specific surface area was dependent on the vapour partial pressure of the reducing metal, however. The oxygen content of all samples was substantially around 3000 µ/g/$m^2$ (ppm/$(m^2/g)$) surface area, i.e. the oxygen content scarcely exceeded the oxygen content needed to prevent the powders from burning away on contact with ambient air.

The samples then underwent a standardised treatment in an ultrasonic bath, wherein weak sintered bridges between the agglomerates were destroyed. Determination of the particle size distribution after ultrasonic treatment produced the $D10_{US}$, $D50_{US}$ and $D90_{US}$ values that are likewise set out in the table. The ratio of $D50/D50_{US}$ can be regarded as a relative measure for the stability of the sintered bridges produced during the reduction. It can be seen that even after the reduction, the stability of the sintered bridges is clearly greater, the lower the temperature at which the reduction was performed.

B) Deoxidisation of the Tantalum Powders

The powders from examples 1 to 16 were saturated with ammonium dihydrogen phosphate solution and dried so that a phosphorus doping of 150 ppm was obtained.

The powders were then mixed with a 1.2 times stoichiometric amount of magnesium relative to their individual oxygen content and heated under argon protective gas for two hours to 700° or 800° C., cooled, passivated, washed free from magnesium oxide and rubbed through a sieve with a mesh size of 300 µm. The particle size distribution of the powders that were obtained (as D10, D50 and D90 values according to ASTM B 822, and corresponding values after standardised ultrasonic treatment) and the specific surface area are set out in Table 2.

The powders were used to make compacts measuring 3 mm in diameter and 3.96 mm in length, with a compressed density of 5.0 g/$cm^3$, wherein a tantalum wire of thickness 0.2 mm was inserted in the extrusion die as a contact wire before the powders were added. The compacts were sintered for 10 minutes at 1210° C. under high vacuum.

The anode bodies were dipped in 0.1% phosphoric acid and formed at a current intensity limited to 150 mA up to a forming voltage of 16 V. Following the fall-off in the current intensity, the voltage was sustained for a further hour. A cathode consisting of 18% sulfuric acid was used to measure the capacitor properties. Measurements were performed with an alternating voltage of 120 Hz.

Specific capacity and residual current are shown in Table 2.

TABLE 1

| | Reduction conditions | | | Product properties | | | | | | | | |
|---|---|---|---|---|---|---|---|---|---|---|---|---|
| | Gas | Reactor | Red. | Spec. surface | MasterSizer | | | $O_2$ | MasterSizer after US[1] | | | |
| Ex no. | pressure hPa | temp. °C. | time h | area $m^2/g$ | D10 μm | D50 μm | D90 μm | cont. μg/$m^2$ | $D10_{US}$ μm | $D50_{US}$ μm | $D90_{US}$ μm | D50/ $D50_{US}$ |
| 1 | 50 | 700 | 8 | 13.4 | 14.6 | 30.5 | 52.7 | 3441 | 0.59 | 12.7 | 28.3 | 2.40 |
| 2 | 200 | 750 | 8 | 10.1 | 16.0 | 33.1 | 66.0 | 2765 | 0.59 | 13.6 | 33.7 | 2.43 |
| 3 | 350 | 750 | 8 | 12.3 | 14.9 | 31.1 | 53.4 | 3064 | 0.58 | 10.1 | 29.7 | 3.08 |
| 4 | 500 | 780 | 8 | 7.3 | 14.2 | 29.7 | 49.7 | 4063 | 0.53 | 9.5 | 24.1 | 3.13 |
| 5 | 500 | 840 | 8 | 6.3 | 12.9 | 26.9 | 43.7 | 2492 | 0.53 | 8.0 | 23.5 | 3.36 |
| 6 | 550 | 860 | 8 | 4.4 | 11.8 | 26.8 | 44.8 | 2654 | 0.61 | 8.2 | 25.9 | 3.27 |
| 7 | 580 | 880 | 8 | 4.7 | 9.3 | 26.6 | 48.4 | 2787 | 0.55 | 5.9 | 21.8 | 4.51 |
| 8 | 580 | 900 | 8 | 3.8 | 16.2 | 32.7 | 59.7 | 2872 | 0.67 | 6.3 | 19.2 | 5.19 |
| 9 | 1000 | 940 | 8 | 2.7 | 16.7 | 34.6 | 60.3 | 2798 | 0.71 | 14.1 | 27.7 | 2.45 |
| 10 | see FIG. 1 | D, FIG. 1 | see FIG. 1 | 12.9 | 15.7 | 37.2 | 61.7 | 3362 | 0.61 | 13.2 | 29.7 | 2.82 |
| 11 | see FIG. 1 | C, FIG. 1 | see FIG. 1 | 9.7 | 14.3 | 35.6 | 58.7 | 3257 | 0.63 | 11.3 | 26.8 | 3.15 |
| 12 | see FIG. 1 | B, FIG. 1 | see FIG. 1 | 7.3 | 16.1 | 38.5 | 62.2 | 2912 | 0.55 | 10.5 | 25.7 | 3.67 |
| 13 | see FIG. 1 | A, FIG. 1 | see FIG. 1 | 5.9 | 17.2 | 40.2 | 59.5 | 2974 | 0.58 | 11.2 | 27.1 | 3.59 |
| 14 | 250 | 700->780 | 7 | 11.7 | 16.8 | 39.5 | 58.3 | 3196 | 0.60 | 14.6 | 31.3 | 2.71 |
| 15 | 350 | 720->800 | 7 | 10.2 | 18.2 | 42.9 | 63.7 | 3027 | 0.64 | 15.1 | 32.4 | 2.84 |
| 16 | 450 | 730->800 | 7 | 10.4 | 16.9 | 43.4 | 62.6 | 3065 | 0.63 | 15.0 | 33.6 | 2.89 |

[1]US = ultrasonic treatment

TABLE 2

| | | Product properties after primary structure coarsening | | | | | | | Capacitor | |
|---|---|---|---|---|---|---|---|---|---|---|---|
| | Deoxid. | MasterSizer | | | MasterSizer after US[1] | | | | Spec. surface | Spec. capacity | Spec. resid. current |
| Ex no. | temp. °C. | D10 μm | D50 μm | D90 μm | $D10_{US}$ μm | $D50_{US}$ μm | $D90_{US}$ μm | D50/ $D50_{US}$ | area $m^2/g$ | μFV/g | nA/μFV |
| 1 | 700 | 18.9 | 49.9 | 215.9 | 12.3 | 40.6 | 72.3 | 1.23 | 2.79 | 142084 | 1.22 |
| 2 | 700 | 18.5 | 39.9 | 216.7 | 6.9 | 23.9 | 74.6 | 1.67 | 3.02 | 153836 | 0.49 |
| 3 | 700 | 18.3 | 38.7 | 213.3 | 7.1 | 25.0 | 71.8 | 1.55 | 2.89 | 144486 | 1.42 |
| 4 | 700 | 15.9 | 32.4 | 75.5 | 0.89 | 17.1 | 40.1 | 1.89 | 3.11 | 156347 | 0.67 |
| 5 | 800 | 14.2 | 28.8 | 47.8 | 0.79 | 15.8 | 32.1 | 1.82 | 1.83 | 103484 | 0.46 |
| 6 | 800 | 15.2 | 31.4 | 67.1 | 1.52 | 15.9 | 38.5 | 1.98 | 1.87 | 106705 | 0.64 |
| 7 | 800 | 18.8 | 35.8 | 67.1 | 0.96 | 18.7 | 43.4 | 1.91 | 1.92 | 107917 | 0.86 |
| 8 | 700 | 18.9 | 36.5 | 72.8 | 1.05 | 15.2 | 47.5 | 2.40 | 2.90 | 145131 | 0.97 |
| 9 | 800 | 17.3 | 34.8 | 63.2 | 6.38 | 16.5 | 51.2 | 2.11 | 1.90 | 105393 | 0.46 |
| 10 | 700 | 17.9 | 40.6 | 201.5 | 10.1 | 30.1 | 70.7 | 1.35 | 2.85 | 140711 | 1.35 |
| 11 | 800 | 18.1 | 41.7 | 199.7 | 11.3 | 27.6 | 71.8 | 1.51 | 1.93 | 101444 | 1.01 |
| 12 | 800 | 16.1 | 31.8 | 80.4 | 1.03 | 20.1 | 42.3 | 1.58 | 1.81 | 100913 | 0.68 |
| 13 | 700 | 15.4 | 31.5 | 140.9 | 1.95 | 15.2 | 41.4 | 2.07 | 3.05 | 150709 | 0.88 |
| 14 | 800 | 17.7 | 39.3 | 190.7 | 8.4 | 29.8 | 69.5 | 1.32 | 1.68 | 96631 | 1.21 |
| 15 | 800 | 17.9 | 40.5 | 180.3 | 11.7 | 29.1 | 70.5 | 1.39 | 1.75 | 98770 | 1.41 |
| 16 | 700 | 17.8 | 36.3 | 187.8 | 6.3 | 21.1 | 65.3 | 1.72 | 2.99 | 143576 | 1.29 |

[1]US = ultrasonic treatment

The invention claimed is:

1. Process for the production of valve metal powders by reduction of corresponding valve metal oxide powders by means of vaporous reducing metals and/or hydrides thereof, characterised in that the reduction is performed under a vapour pressure of the reducing metal/metal hydride of 5 to 110 hPa and the overall pressure in the reaction chamber during all of the reduction period is less than 1000 hPa.

2. Process according to claim 1, wherein the vapour pressure of the reducing metal is less than 80 hPa.

3. Process according to claim 2, wherein the vapour pressure of the reducing metal is between 8 and 50 hPa.

4. Process according to claim 1, wherein the valve metal oxide comprises an oxide of at least one metal selected from the group consisting of titanium, zirconium, hafnium, vanadium, niobium, tantalum, molybdenum and tungsten.

5. Process according to claim 4, wherein tantalum pentoxide is used as valve metal oxide.

6. Process according to claim 1, wherein the reduction is performed in the presence of an inert carrier gas.

7. Process according to claim 6, wherein the partial pressure of the inert carrier gas is less than 600 hPa.

8. Process according to claim 6, wherein the partial pressure of the inert carrier gas is 100 to 500 hPa.

9. Process according to claim 6, wherein the partial pressure of the inert carrier gas is 50 to 800 hPa.

10. Process according to claim 1, wherein the source of the reducing metal or hydride is in a separate location from the valve metal oxide to be reduced.

11. Process according to claim 1, wherein magnesium vapour is used as the gaseous reducing metal.

12. Process according to claim 1, wherein tantalum pentoxide is used as the valve metal oxide powder and the tantalum metal powder that is produced is mixed with hyperstoichiometric amounts of magnesium in a further step and heated to 680 to 850° C., so that the specific surface area of the tantalum metal powder is reduced to less than ⅓ of the specific surface area of the tantalum metal powder before the subsequent treatment.

13. Process according to claim 1, wherein the valve metal oxide is an oxide of niobium or tantalum or a mixture thereof.

14. Process for the production of tantalum powder, from which capacitors having a specific capacity of 60,000 to 160,000 μFV/g can be produced by compacting and sintering at 1200 to 1250° C., characterised in that a tantalum pentoxide powder is reduced under a vapour pressure of 5 to 110 hPa the overall pressure in the reaction space during the entire reduction is less than 1000 hPa, and at a temperature of below 880° C. by means of magnesium vapour, such that a metal powder having a specific surface area of 6 to 15 m²/g is produced, then after mixing with a slightly hyperstoichiometric amount of magnesium at a temperature of 680 to 850° C. the surface of the metal powder is reduced by a factor of at least 3 to 0.9 to 4 m²/g.

15. A process for the production of valve metal powders by reduction of corresponding valve metal oxide powders by means of vaporous reducing metals and/or hydrides thereof, characterised in that the reduction is performed under a vapour pressure of the reducing metal/metal hydride of 5 to 110 hPa and the overall pressure in the reaction chamber during all or part of the reduction period is less than 1000 hPa wherein the metal powder that is produced is mixed with hyperstoichiometric amounts of magnesium in a further step and heated to 680 to 850° C., so that the specific surface area of the valve metal powder is reduced to less than ⅓ of the specific surface area of the valve metal powder before the subsequent treatment.

16. Process according to claim 15, wherein the vapour pressure of the reducing metal is between 8 and 50 hPa.

17. Process according to claim 15, wherein the valve metal oxide comprises an oxide of at least one metal selected from the group consisting of titanium, zirconium, hafnium, vanadium, niobium, tantalum, molybdenum and tungsten.

18. Process according to claim 17, wherein tantalum pentoxide is used as valve metal oxide.

19. Process according to claim 15, wherein the reduction is performed in the presence of an inert carrier gas.

20. Process according to claim 19, wherein the partial pressure of the inert carrier gas is 50 to 800 hPa.

* * * * *